United States Patent [19]

Alessio

[11] 4,306,264

[45] Dec. 15, 1981

[54] DISCONNECT AND OVERLOAD BYPASS ARRANGEMENT FOR A PORTABLE TOOL

[75] Inventor: Lorenzo E. Alessio, Lecco, Italy

[73] Assignee: Black & Decker Inc., Newark, Del.

[21] Appl. No.: 60,436

[22] Filed: Jul. 25, 1979

[30] Foreign Application Priority Data

Jul. 26, 1978 [IT] Italy .................. 26136 A/78

[51] Int. Cl.³ .................................... H02H 7/085
[52] U.S. Cl. .......................... 361/23; 310/68 C;
   318/345 G; 318/334; 318/783; 361/26; 361/32;
   361/58
[58] Field of Search ................... 310/50, 68 C;
   361/23–27, 31, 32, 58, 105, 34, 37; 323/9, 101,
   119; 318/783, 784, 791, 792, 345 G, 334,
   471–473

[56] References Cited

U.S. PATENT DOCUMENTS

| | | | |
|---|---|---|---|
| 1,830,578 | 11/1931 | Vaughan | 310/68 C X |
| 2,056,040 | 9/1936 | Dozler | 310/68 C X |
| 2,514,012 | 7/1950 | Rypinski | 361/23 X |
| 3,225,280 | 12/1965 | Happe et al. | 318/473 X |
| 3,292,069 | 12/1966 | Evans, Jr. | 318/345 G |

*Primary Examiner*—Harry E. Moose, Jr.
*Attorney, Agent, or Firm*—Walter Ottesen; Leonard Bloom; Edward D. Murphy

[57] ABSTRACT

The invention is directed to a disconnect and overload bypass arrangement for a hand-held portable tool equipped with an electric motor supplied from a source of electrical energy and a manually operable on-off switch for switching the tool on and off. The arrangement includes a self-reclosing disconnect switch operatively connected to the motor to temporarily disconnect the same from the energy source in response to an overload condition; and, circuit control means for supplying energy to the motor at a reduced level when the disconnect switch is open whereby the motor will continue to operate at reduced torque pending self-reclosure of the disconnect switch and thereby provide the operator of the tool with an audible and visual indication that the motor has not been deactivated by manually actuating the on-off switch.

6 Claims, 4 Drawing Figures

DISCONNECT AND OVERLOAD BYPASS ARRANGEMENT FOR A PORTABLE TOOL

BACKGROUND OF THE INVENTION

The invention is directed to a disconnect and overload bypass arrangement for a hand-held, portable tool which reduces the torque of the electric motor of a portable tool such as an angle grinder, drill or the like during overload situations.

It is known to equip such tools with a safety thermal disconnect switch capable of automatically cutting off the supply of current in the event the electric motor overheats, for instance, as a result of excessive loads applied to the tool by the operator. After the motor cools, the thermal disconnect will automatically reclose thereby permitting resumption of the normal operation of the tool. Thus, thermal disconnect switches temporarily disconnect all electrical energy from the tool motor so that it appears as if the tool is completely deenergized. However, as soon as the motor has cooled, the thermal disconnect will close and again apply energy to the motor.

Everything is in order if the operator is attentive and has the tool under control even during the overheat condition. If, however, as happens frequently, the operator will put the tool down without turning off the on-off switch. Under these circumstances, the tool with restart of its own accord when the thermal disconnect switch cools and recloses. If the tool is improperly set down by the operator, then the tool could move about the work area in an uncontrolled manner causing damage to property and even injury to personnel.

In addition to the above, disconnect switches relying on only thermal action often require a relatively long time to reclose so that the operator of the tool loses time in the performance of his assigned task.

SUMMARY OF THE INVENTION

In view of the foregoing, it is an object of the invention to provide the operator of a hand-held, portable tool with an audible and visual indication that a tool temporarily disconnected because of an overload condition is nonetheless still connected to its energy source. More specifically, it is an object of the invention to provide a circuit arrangement for a hand-held, portable tool equipped with a self-reclosing disconnect switch which will alert the operator of the tool that the tool is energized even though temporarily disabled because of an overload condition thereby preventing uncontrolled operation of the tool upon self-reclosing of the disconnect switch.

It is still another object of the invention to provide an overload disconnect and bypass arrangement for a portable tool wherein the time from opening to reclosure of the disconnect switch is relatively short.

The above objects are realized with the overload disconnect and bypass arrangement according to the invention. The arrangement of the invention is intended for portable tools equipped with an electric motor supplied from a source of electrical energy and a manually operable on-off switch for switching the tool on and off. The arrangement of the invention includes: a self-reclosing disconnect switch operatively connected to the motor to temporarily disconnect the same from the energy source in response to an overload condition; and, a control circuit for supplying energy to the motor at a reduced level when the disconnect switch is open whereby the motor will continue to operate at reduced torque pending self-reclosure of the disconnect switch and thereby provide the operator of the tool with an audible and visual indication that the motor has not been deactivated by manually actuating the on-off switch.

Preferably, the disconnect switch is responsive to overload current so that it can reclose quickly. Although, the overload current disconnect switch is preferable, the arrangement according to the invention can also operate with a disconnect switch which is responsive to a thermal overload condition. However, for such a temperature sensitive disconnect switch, the reaction time for reclosure would be relatively long. The operation of a thermally sensitive disconnect switch would be dependent upon thermal inertia which, in turn, is determined by factors such as the size of the tool motor and the location of the disconnect switch within the motor.

Preferably, the control circuit is placed in parallel with the disconnect switch and supplies energy at a reduced level to the motor as mentioned above. The control circuit can include an SCR-type rectifier having a predetermined firing angle to provide the desired reduced level of energy.

With the control circuit connected and operating as described above, the disconnect switch does not bring about the complete stoppage of the motor; rather, motor operation is at a low speed thereby preventing the operator from leaving the work site and inadvertently forgetting about the tool without having first manually switched the tool off completely by actuating the on-off switch.

An overcurrent condition usually occurs when the operator bears down on the portable tool with excessive force and this overcurrent condition will actuate the disconnect switch causing the same to open and placing the tool in the low speed operating condition. This will cause the operator to promptly let up the pressure on the tool and the disconnect switch will rapidly reclose.

For the situation wherein the disconnect switch is of the type responding to a rise in temperature, the operator will be compelled to keep the tool under his control while waiting for the motor to cool down and the disconnect switch to reclose so that the tool once again can be utilized at its normal operating capacity. It should be noted that motors are usually fitted with small cooling fans so that the continuous operation at a low speed facilitates cooling of the motor and therefore shortens the time required for the motor to cool down so that work with the tool can continue.

The conduction-limiting devices usable in the control circuit can be of many types. They can for instance be a simple normally bypassed resistors or else phase-controlled devices such as the SCR-type mentioned above or a TRIAC device can be provided.

BRIEF DESCRIPTION OF THE DRAWING

The foregoing objects and advantages of the invention will become more apparent from a consideration of the detailed description to follow in conjunction with the drawing annexed hereto wherein.

DESCRIPTION OF THE PREFERRED EMBODIMENT OF THE INVENTION

Figure 1:
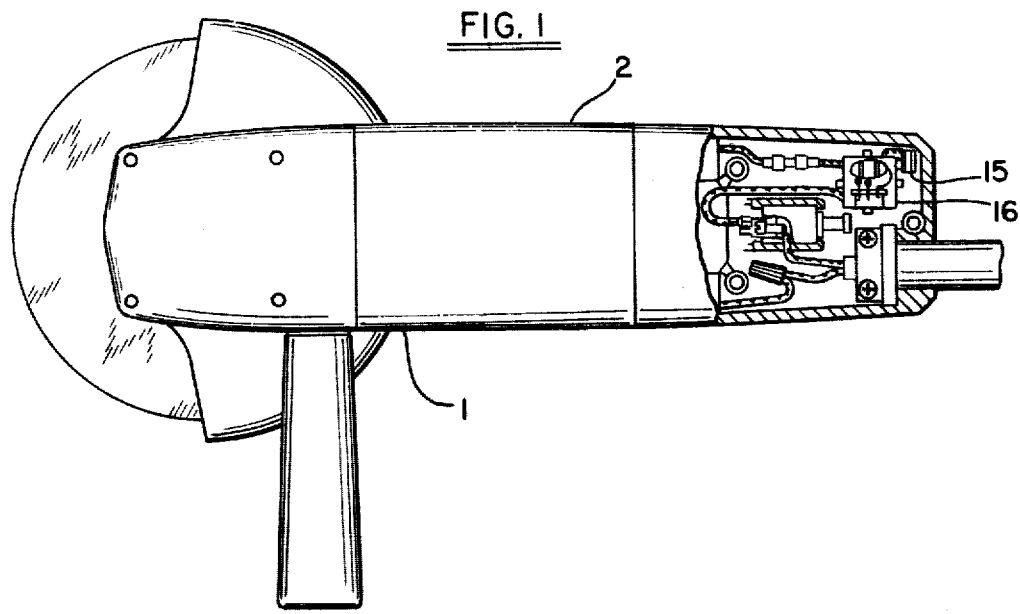
FIG. 1 is a plan view of a small angle-grinder with a portion of the housing broken away to illustrate how the disconnect switch and control circuit can be positioned in a hand-held portable tool.

Referring now to FIG. 1, reference numeral 1 designates a small angle grinder having a motor housing 2 equipped with a motor. A disconnect switch 15 is mounted in the motor housing together with circuit control means in the form of a control circuit 16.

Figure 2:
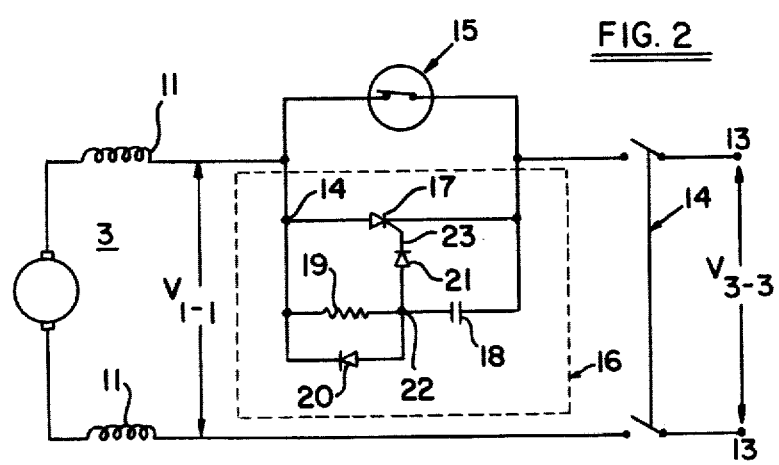
FIG. 2 is a schematic diagram of the disconnect and overload bypass arrangement according to the invention.

FIG. 2 represents schematically the arrangement shown in FIG. 1. Referring to FIG. 2 of the drawing, the field windings 11 of the electric motor 3 are supplied with alternating current from a pair of terminals 13 through a two-pole switch 14 manually actuable by the operator to turn the portable tool on or off.

Between the switch 14 and the field windings 11 there is arranged a current-sensitive disconnect switch 15 which is commercially available as Klixon 9700K45-11 from Texas Instruments Incorporated. This switch 15 is current sensitive and acts in the manner of a circuit breaker to cut off the supply of current to the motor 3 in response to an overcurrent condition.

A energy limiting device in the form of a control circuit 16 is connected in prallel with the disconnect switch 15. The control circuit 16 includes a series circuit connected in parallel with a silicon-controlled rectifier 17. The series circuit is a phase-shift circuit for the rectifier 17 and is made up of a resistor 19 and a capacitor 18. A diode 20 is connected across the resistor 19 and forms part of the phase-shift circuit; this diode 20 enables a firing angle of less than 90° to be realized. Another diode 21 is connected between a node 22 of the phase-shift circuit and the gate electrode 23 of the rectifier 17 to prevent excessive voltages from appearing across the gate-cathode junction thereof.

During the normal operation of the electric motor 3 and the tool of which the motor 3 is a part, the switch 15 is closed and motor supply current passes therethrough with the switch 15 itself constituting a path of low resistance and effectively short-circuiting the control circuit 16.

In the event of an overcurrent condition, the switch 15 opens automatically thereby leaving only the control device 16 in series with the motor 3.

Figure 3A:
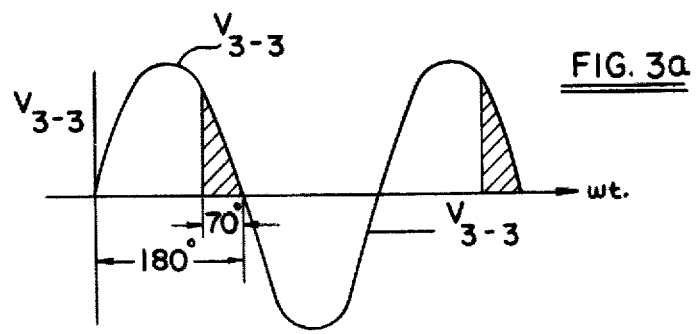
FIG. 3a is a waveform of the applied voltage showing the firing angle of the rectifier of the control circuit of the arrangement of the invention; and, FIG. 3b is a waveform of the voltage applied to the motor through the control circuit when the disconnect switch is open.

After the switch 15 opens, a fullwave voltage $V_{3-3}$ as shown in FIG. 3a will continue to appear across terminals 13; however, the rectifier 17 will not conduct the current corresponding to the negative-half portion of the wave. Indeed, the rectifier 17 will only conduct current corresponding to the shaded portion of the positive half-wave of the fullwave voltage depending upon the firing angle of the rectifier 17. The firing angle is determined by the phase-shift circuit which in FIG. 3a is approximately 70°.

More specifically, the resistor 19 and diode 20 introdue a lag in the phase of the voltage appearing at node 22 and so determine the phase of the gating signal applied to the gate electrode 23. Stated otherwise, the phase-shift circuit determines the point on the applied cycle of the supply voltage $V_{3-3}$ at which the rectifier 17 will begin forward conduction and therefore determines the power output passed by the rectifier 17 to the motor 3. The shaded portion of the waveform is the energy actually supplied to the motor 3 and is substantially less than the energy applied to the motor 3 when the switch 15 is closed. The waveform $V_{1-1}$ of the voltage applied to the motor when the switch 15 is open is shown in FIG. 3b.

The firing angle of the triggering voltage depends on the RC constant of the phase-shift circuit and can be set within wide limits by an appropriate selection of components. As a result, even if the switch 15 is open, the motor 3 continues to be supplied with a reduced, but not with zero current that permits operation at a slow speed and reduced torque. This provides a positive audible and visual indication to the operator that the tool is still turned on so that the operator will continue to maintain adequate control of the tool rather than set it down. When the overcurrent condition is removed, the disconnect switch 15 will reclose placing the tool once again in a full-performance operating condition.

Figure 3B:
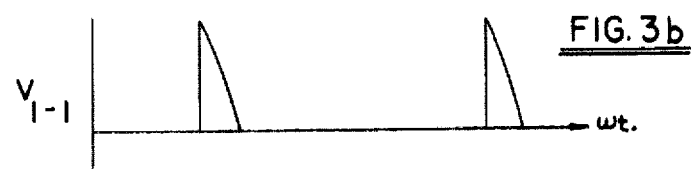

As mentioned, a TRIAC could be used in lieu of an SCR-type device in which case full-wave rectification would be had rather than the half-wave rectification shown in FIGS. 3a and 3b.

What is claimed is:

1. A disconnect and overload bypass arrangement for a hand-held portable tool equipped with an electric motor supplied from a source of electrical energy and a manually operable on-off switch for switching the tool on and off, the arrangement comprising:

a self-reclosing disconnect switch operatively connected to the motor to temporarily disconnect the same from the energy source in response to an overload condition; and, circuit control means for supplying energy to said motor at a substantially reduced level when said disconnect switch is open, whereby said motor will continue to operate at reduced torque pending self-reclosure of said disconnect switch and thereby provide the operator of the tool with an audible and visual indication that the motor has not been deactivated by manually acutating the on-off switch;

said circuit control means being connected in parallel with said disconnect switch and including:

rectifier means connected in parallel with said disconnect switch, for substantially limiting the flow of energy to said motor during said overload condition; and, a phase-shift circuit connected to said rectifier means for determining the firing angle of said rectifier means.

2. A hand-held portable tool, comprising:

an electric motor arranged for connection to a source of electrical energy;

a manually operable on-off switch for switching the motor on and off;

a self-reclosing disconnect switch operatively connected to the motor to temporarily disconnect the motor from the energy source in response to an overload condition;

rectifier means connected in parallel with said disconnect switch and being effectively short-circuited by said disconnect switch when the latter is closed; and a phase-shift circuit connected to said rectifier means for determining firing angle of said rectifier means to allow a substantially limited flow of energy to the motor when said disconnect switch is open, whereby the motor will continue to operate at reduced torque pending self-reclosure of said disconnect switch and thereby provide the operator of the tool with an audible and visual indication that the motor has not been deactivated by manual actuation of the on-off switch.

3. The hand-held portable tool recited in claim 2, wherein said disconnect switch is a switch for sensing overcurrent.

4. The hand-held portable tool recited in claim 3, wherein said disconnect switch is a switch for sensing an overheat condition.

5. A hand-held portable tool, comprising:
a motor housing;
an electric motor contained in said motor housing and arranged for connection to a source of electrical energy;
a manually operable on-off switch for switching the motor on and off;
a self-reclosing disconnect switch contained in said motor housing and operatively connected to the motor to temporarily disconnect the motor from the energy source in response to an overload condition;
rectifier means contained in said motor housing adjacent said disconnect switch and connected in parallel with said disconnect switch, said rectifier means being effectively short-circuited by said disconnect switch when the latter is closed; and,
a phase-shift circuit contained in said motor housing adjacent said disconnect switch and connected to said rectifier means, said phase-shift circuit including a diode arranged to determine that said rectifier means realizes a firing angle of less than 90 degrees to allow a limited flow of energy to the motor when said disconnect switch is open, whereby the motor will continue to operate at reduced torque pending self-reclosure of said disconnect switch and thereby provide the operator of the tool with an audible and visual indication that the motor has not been deactivated by manual actuation of the on-off switch.

6. A hand-held portable tool, comprising:
a housing;
an electric motor contained in said housing and arranged for connection to a source of electrical energy;
a manually operable on-off switch for switching the motor on and off;
a self-reclosing disconnect switch mounted in said housing and operatively connected to the motor to temporarily disconnect the motor from the energy source in response to an overload condition;
a control circuit contained in said housing adjacent said disconnect switch and connected in parallel with said disconnect switch, said control switch being effectively short-circuited by said disconnect switch when the latter is closed;
said control circuit comprising a rectifier having a gate electrode and being connected in parallel with said disconnect switch, a phase-shift circuit connected in parallel with said rectifier, and a first diode connected between said phase-shift circuit and said gate electrode;
said phase-shift circuit comprising a resistor, a capacitor, and a second diode, said resistor being connected in series with said capacitor and in parallel with said second diode, and said first diode being connected to a node of said phase-shift circuit between said resistor and said capacitor to prevent excessive voltages from appearing across the gate-cathode junction of said rectifier; and
said phase-shift circuit determining the firing angle of said rectifier for allowing a limited flow of energy to the motor when said disconnect switch is open, whereby the motor will continue to operate at reduced torque pending self-reclosure of said disconnect switch and thereby provide the operator of the tool with an audible and visual indication that the motor has not been deactivated by manual actuation of the on-off switch.

* * * * *